(12) United States Patent
Yi et al.

(10) Patent No.: US 10,520,357 B2
(45) Date of Patent: Dec. 31, 2019

(54) ARC LIGHT SENSOR AND ARC LIGHT DETECTION METHOD

(71) Applicant: Siemens Aktiengesellschaft, Munich (DE)

(72) Inventors: Xing Yi, Shanghai (CN); Wei Gang Chen, Shanghai (CN); Yue Zhuo, Beijing (CN); Ji Zhang, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 234 days.

(21) Appl. No.: 15/597,427

(22) Filed: May 17, 2017

(65) Prior Publication Data
US 2018/0003555 A1   Jan. 4, 2018

(30) Foreign Application Priority Data

Jun. 30, 2016  (CN) .......................... 2016 1 0509473

(51) Int. Cl.
*G01J 1/04*   (2006.01)
*G02F 1/01*   (2006.01)
(Continued)

(52) U.S. Cl.
CPC ........... *G01J 1/0429* (2013.01); *G01J 1/0414* (2013.01); *G01J 1/0437* (2013.01);
(Continued)

(58) Field of Classification Search
CPC ...... G01J 1/0414; G01J 1/0429; G01J 1/0437; G02F 1/0036; G02F 1/0136; G02F 1/09; G02B 5/3025
(Continued)

(56) References Cited

U.S. PATENT DOCUMENTS 3,873,804 A * 3/1975 Gordon ................... A61F 9/067
                                                      219/147
8,154,730 B2   4/2012 Allcock
(Continued)

FOREIGN PATENT DOCUMENTS

CN       101662137 A       3/2010
CN       105115596 A      12/2015
(Continued)

OTHER PUBLICATIONS

Office Action for Chinese Patent Application No. 201610509473.3 dated Mar. 25, 2019.

*Primary Examiner* — Ricky D Shafer
(74) *Attorney, Agent, or Firm* — Harness, Dickey & Pierce, P.L.C.

(57) ABSTRACT

In an embodiment, an arc light sensor includes: a first polarizer, a second polarizer, a magneto-optical material, a first light filter and a processing unit. The first polarizer is used for polarizing incident first target light, to form first polarized light in a first polarization direction. The second polarizer is used for polarizing incident second target light, to form second polarized light in the first polarization direction. The magneto-optical material, in a current magnetic field, uses the current magnetic field to rotate a polarization direction of the first polarized light, to form third polarized light. The first light filter is used for filtering the third polarized light, to form fourth polarized light capable of passing in a second polarization direction. The processing unit is used for determining whether the second target light is arc light according to intensity of the second polarized light and intensity of the fourth polarized light.

20 Claims, 3 Drawing Sheets

(51) Int. Cl.
  *G02F 1/09* (2006.01)
  *G02F 1/00* (2006.01)
  *H01H 33/26* (2006.01)
  *G01J 1/02* (2006.01)
  *G01J 1/44* (2006.01)

(52) U.S. Cl.
  CPC .......... *G02F 1/0036* (2013.01); *G02F 1/0136* (2013.01); *G02F 1/09* (2013.01); *H01H 33/26* (2013.01); *G01J 2001/0276* (2013.01); *G01J 2001/4446* (2013.01)

(58) Field of Classification Search
  USPC .... 359/280, 283, 484.01, 900; 356/222, 229
  See application file for complete search history.

(56) References Cited

U.S. PATENT DOCUMENTS

2005/0128481 A1* 6/2005 Sharps ................ G01J 4/04
                                                    356/364
2007/0268482 A1   11/2007 Aiello et al.

FOREIGN PATENT DOCUMENTS

| CN | 105115597 A | 12/2015 |
| DE | 102014211850 A1 | 12/2015 |
| JP | H1012947 A | 1/1998 |

* cited by examiner

ARC LIGHT SENSOR AND ARC LIGHT DETECTION METHOD

PRIORITY STATEMENT

The present application hereby claims priority under 35 U.S.C. § 119 to Chinese patent application number CN 201610509473.3 filed Jun. 30, 2016, the entire contents of which are hereby incorporated herein by reference.

TECHNICAL FIELD

Field

At least one embodiment of the present invention generally relates to the technical field of photoelectric detection, in particular to an arc light sensor and an arc light detection method.

Background Art

Arc light is a fire outbreak phenomenon of an electric-arc-type short circuit, having characteristics such as high temperature and high brightness, and often occurs in switch cabinets. Due to the high temperature characteristic of arc light, if arc light cannot be dealt with promptly upon its occurrence, the high temperature caused by the arc light will cause melting or sublimation of the conductor generating the arc light as well as materials adjacent to the conductor, leading to destruction of the circuit, affecting normal operation of the circuit, and in serious cases even causing a fire. Thus, arc light must be detected, in order to deal with it promptly upon its occurrence.

Arc light is generally detected by way of an arc light sensor; an existing arc light sensor acquires a light signal and a current signal respectively, combines the light signal and current signal detected, and determines whether arc light has occurred.

With regard to an existing arc light sensor, it must simultaneously acquire a light signal and a current signal, to combine the light signal and current signal to determine whether arc light has occurred, but the current signal is susceptible to interference by various factors, so that the resistance of the arc light sensor to interference is poor.

SUMMARY

To explain a technical solution of embodiments of the present invention, there follows a simple description of the accompanying drawings that need to be used in description of embodiments or the prior art. Obviously, the drawings in the description below are some embodiments of the present invention, and a person skilled in the art could obtain other drawings based on these drawings without expending any inventive effort.

An embodiment of the present invention provides an arc light sensor, comprising: a first polarizer, a second polarizer, a magneto-optical material, a first light filter and a processing unit;

the first polarizer is used for polarizing incident first target light, to form first polarized light in a first polarization direction, and transmitting the first polarized light to the magneto-optical material;
the second polarizer is used for polarizing incident second target light, to form second polarized light in the first polarization direction;
the magneto-optical material is in a current magnetic field, and uses the current magnetic field to rotate a polarization direction of the first polarized light, to form third polarized light, and transmits the third polarized light to the first light filter;
the first light filter is used for filtering the third polarized light, to form fourth polarized light capable of passing in a second polarization direction;
the processing unit is used for determining whether the second target light is arc light according to the intensity of the second polarized light and the intensity of the fourth polarized light.

An embodiment of the present invention also provides an arc light detection method, comprising:
S1: polarizing incident first target light, to form first polarized light in a first polarization direction;
S2: polarizing incident second target light, to form second polarized light in the first polarization direction;
S3: using a current magnetic field to rotate a polarization direction of the first polarized light, to form third polarized light;
S4: filtering the third polarized light, to form fourth polarized light capable of passing in a second polarization direction;
S5: determining whether the second target light is arc light according to the intensity of the second polarized light and the intensity of the fourth polarized light.

An embodiment of the present invention provides an arc light sensor, comprising: a first polarizer, a second polarizer, a magneto-optical material, a first light filter and a processing unit;

the first polarizer is used for polarizing incident first target light, to form first polarized light in a first polarization direction, and transmitting the first polarized light to the magneto-optical material;
the second polarizer is used for polarizing incident second target light, to form second polarized light in the first polarization direction;
the magneto-optical material is in a current magnetic field, and uses the current magnetic field to rotate a polarization direction of the first polarized light, to form third polarized light, and transmits the third polarized light to the first light filter;
the first light filter is used for filtering the third polarized light, to form fourth polarized light capable of passing in a second polarization direction;
the processing unit is used for determining whether the second target light is arc light according to the intensity of the second polarized light and the intensity of the fourth polarized light.

In an example embodiment of the present invention,
the first polarization direction is perpendicular to the second polarization direction.

In another an example embodiment of the present invention,
the processing unit is used for determining whether the second target light is arc light according to an intensity ratio of the fourth polarized light to the second polarized light.

In another an example embodiment of the present invention,
when the first target light and the second target light are light emitted by the same light source, the arc light sensor further comprises: a first light detector and a second light detector;
the first light detector is used for acquiring the fourth polarized light formed by the first light filter, detecting the intensity of the fourth polarized light, and sending the intensity of the fourth polarized light to the processing unit;

the second light detector is used for acquiring the second polarized light formed by the second polarizer, detecting the intensity of the second polarized light, and sending the intensity of the second polarized light to the processing unit.

In another example embodiment of the present invention, when the first target light and the second target light are light emitted by different light sources, the arc light sensor further comprises: a fixed light source, a coupling unit, a light splitter and a second light filter;

the fixed light source is used for emitting the first target light to the first polarizer;

the coupling unit is connected to the second polarizer, the magneto-optical material and the light splitter separately, and is used for coupling together the second polarized light formed by the second polarizer and the third polarized light formed by the magneto-optical material, and transmitting coupled light to the light splitter;

the light splitter is connected to the first light filter and the second light filter separately, and used for splitting the coupled light into two beams of coupled light, transmitting first coupled light therein to the first light filter, and transmitting second coupled light therein to the second light filter;

the first light filter is further used for filtering the second polarized light in the first coupled light, taking the second polarized light that is able to pass in the second polarization direction to be a part of the fourth polarized light, and outputting the fourth polarized light;

the second light filter is used for filtering the third polarized light in the second coupled light, taking the third polarized light that is able to pass in the first polarization direction to be a part of the second polarized light, and outputting the second polarized light.

In an example embodiment, the processing unit is further used for determining whether a light communication line from the fixed light source to the processing unit is connected according to the intensity of the second polarized light.

In an example embodiment, the arc light sensor further comprises: a third light detector and a fourth light detector;

the third light detector is used for acquiring the fourth polarized light outputted by the first light filter, detecting the intensity of the fourth polarized light, and sending the intensity of the fourth polarized light to the processing unit;

the fourth light detector is used for acquiring the second polarized light outputted by the second light filter, detecting the intensity of the second polarized light, and sending the intensity of the second polarized light to the processing unit.

An embodiment of the present invention also provides an arc light detection method, comprising:

S1: polarizing incident first target light, to form first polarized light in a first polarization direction;

S2: polarizing incident second target light, to form second polarized light in the first polarization direction;

S3: using a current magnetic field to rotate a polarization direction of the first polarized light, to form third polarized light;

S4: filtering the third polarized light, to form fourth polarized light capable of passing in a second polarization direction;

S5: determining whether the second target light is arc light according to the intensity of the second polarized light and the intensity of the fourth polarized light.

In an example embodiment of the present invention, step 5 comprises: determining whether the second target light is arc light according to an intensity ratio of the fourth polarized light to the second polarized light.

In another example embodiment of the present invention, before step S1, the method further comprises: emitting the first target light via a fixed light source;

after step S3, and before step S4, the method further comprises:

coupling together the second polarized light and the third polarized light, and splitting the coupled light into two beams of coupled light, which are first coupled light and second coupled light respectively;

filtering the second polarized light in the first coupled light, and taking the second polarized light that is able to pass in the second polarization direction to be a part of the fourth polarized light;

filtering the third polarized light in the second coupled light, and taking the third polarized light that is able to pass in the first polarization direction to be a part of the second polarized light.

In the arc light sensor and arc light detection method provided in embodiments of the present invention, the magneto-optical material can rotate the polarization direction of first polarized light under the action of a current magnetic field to form third polarized light. Since the occurrence of arc light is accompanied by an overcurrent phenomenon, a large current will give rise to a strong current magnetic field, and the magneto-optical material causes the polarization direction of the first polarized light to rotate through a large angle under the action of the strong current magnetic field. The polarization direction of the third polarized light determines the intensity of the fourth polarized light that is able to pass through the first light filter, therefore the intensity of the fourth polarized light reflects the size of the current. The intensity of the second polarized light reflects the intensity of the second target light, hence it is possible to determine whether the second target light is arc light according to the intensity of the second polarized light and the intensity of the fourth polarized light. Since there is no need to acquire a current signal, a situation where a current signal suffers interference from various factors, causing interference to the determination result, is avoided, thereby increasing the interference resistance of the arc light sensor.

BRIEF DESCRIPTION OF THE DRAWINGS

To explain the technical solution in embodiments of the present invention or in the prior art more clearly, there follows a simple description of the accompanying drawings that need to be used in description of embodiments or the prior art. Obviously, the drawings in the description below are some embodiments of the present invention, and a person skilled in the art could obtain other drawings based on these drawings without expending any inventive effort.

DETAILED DESCRIPTION OF EXAMPLE EMBODIMENTS

Figure 1:
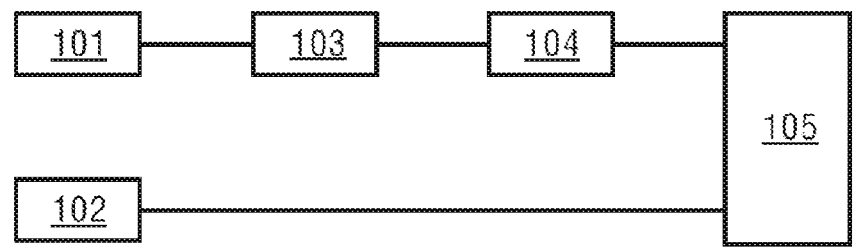
FIG. 1 is a schematic diagram of an arc light sensor provided in an embodiment of the present invention.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

To clarify the object, technical solution and advantages of embodiments of the present invention, the technical solution in embodiments of the present invention is described clearly and completely in conjunction with the drawings in embodiments of the present invention. Obviously, the embodiments described are some, not all, of the embodiments of the present invention. Based on embodiments in the present invention, all other embodiments obtained by those skilled in the art without expending any inventive effort shall be included in the scope of protection of the present invention.

As FIG. 1 shows, one embodiment of the present invention provides an arc light sensor, comprising: a first polarizer 101, a second polarizer 102, a magneto-optical material 103, a first light filter 104 and a processing unit 105;

the first polarizer 101 is used for polarizing incident first target light, to form first polarized light in a first polarization direction, and transmitting the first polarized light to the magneto-optical material 103;

the second polarizer 102 is used for polarizing incident second target light, to form second polarized light in the first polarization direction;

the magneto-optical material 103 is in a current magnetic field, and uses the current magnetic field to rotate a polarization direction of the first polarized light, to form third polarized light, and transmits the third polarized light to the first light filter 104;

the first light filter 104 is used for filtering the third polarized light, to form fourth polarized light capable of passing in a second polarization direction;

the processing unit 105 is used for determining whether the second target light is arc light according to the intensity of the second polarized light and the intensity of the fourth polarized light.

In the arc light sensor provided in an embodiment of the present invention, the magneto-optical material can rotate the polarization direction of first polarized light under the action of a current magnetic field to form third polarized light. Since the occurrence of arc light is accompanied by an overcurrent phenomenon, a large current will give rise to a strong current magnetic field, and the magneto-optical material causes the polarization direction of the first polarized light to rotate through a large angle under the action of the strong current magnetic field. The polarization direction of the third polarized light determines the intensity of the fourth polarized light that is able to pass through the first light filter, therefore the intensity of the fourth polarized light reflects the size of the current. The intensity of the second polarized light reflects the intensity of the second target light, hence it is possible to determine whether the second target light is arc light according to the intensity of the second polarized light and the intensity of the fourth polarized light. Since there is no need to acquire a current signal, a situation where a current signal suffers interference from various factors, causing interference to the determination result, is avoided, thereby increasing the interference resistance of the arc light sensor.

In one embodiment of the present invention, the first polarization direction and second polarization direction may be perpendicular to each other. When the first polarization direction is perpendicular to the second polarization direction, if no arc light has occurred, the intensity of the current magnetic field is low, the polarization direction of the first polarized light rotates through a small angle under the action of the magneto-optical material 103, the polarization direction of the third polarized light is substantially the same as the polarization direction of the first polarized light, and within the third polarized light, the intensity of fourth polarized light that is able to pass in the second polarization direction is very low; if arc light has occurred, the intensity of the current magnetic field is high, the polarization direction of the first polarized light rotates through a large angle under the action of the magneto-optical material 103, the polarization direction of the third polarized light is markedly different from the polarization direction of the first polarized light, and within the third polarized light, the intensity of fourth polarized light that is able to pass in the second polarization direction is high. If the first polarization direction and second polarization direction are perpendicular to each other, there is a large difference between the intensity of the fourth polarized light in the case of arc light occurrence and the intensity of the fourth polarized light in the case of no arc light occurrence, so the accuracy of arc light determination can be increased.

In one embodiment of the present invention, when determining whether the second target light is arc light according to the intensity of the second polarized light and the intensity of the fourth polarized light, the processing unit 105 can determine whether the second target light is arc light according to an intensity ratio of the second polarized light to the fourth polarized light. If a determination is made on whether the second target light is arc light by way of the intensity of the second polarized light and the intensity of the fourth polarized light directly, it is necessary to determine a threshold for determining second polarized light intensity and fourth polarized light intensity. Different arc lights correspond to current values of different sizes and second target lights of different intensities, therefore different arc lights correspond to different second polarized light intensities and different fourth polarized light intensities, and this leads to lower accuracy when determining whether the second target light is arc light by way of the threshold. When a current value corresponding to the same arc light is large, the intensity of the second target light corresponding thereto is also high, and correspondingly, when the intensity of the second polarized light is large, the intensity of the fourth polarized light is also high, but the intensity ratio of the fourth polarized light to the second polarized light is within a certain range, therefore it is possible to determine whether the second target light is arc light according to the intensity ratio of the fourth polarized light to the second polarized light, thereby increasing the accuracy of arc light determination by the arc light sensor.

Figure 2:
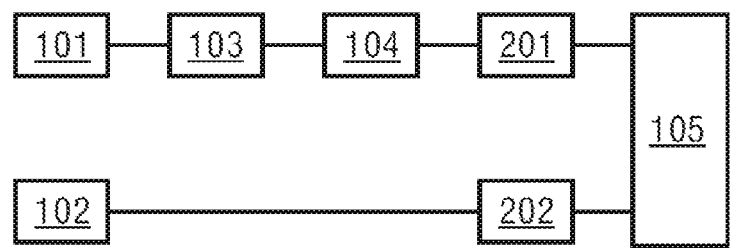
FIG. 2 is a schematic diagram of an arc light sensor provided in another embodiment of the present invention.

In one embodiment of the present invention, the light source of the first target light and second target light is not defined; the first target light and second target light may be light emitted by the same light source, or light emitted by different light sources. Depending on whether the first target light and second target light are light emitted by the same light source, the arc light sensor has the following two different forms:

form A: the first target light and second target light are light emitted by the same light source;
form B: the first target light and second target light are light emitted by different light sources;

In the case of form A, as shown in FIG. 2, the arc light sensor comprises not only the first polarizer 101, second polarizer 102, magneto-optical material 103, first light filter 104 and processing unit 105, but also comprises a first light detector 201 and a second light detector 202;

the first polarizer 101 is connected to the magneto-optical material 103, the magneto-optical material 103 is connected to the first light filter 104, the first light filter 104 is connected by optical fibre to the first light detector 201, and the first light detector 201 is connected to the processing unit 105, to form a first light processing path;

the second polarizer 202 is connected by optical fibre to the second light detector 202, and the second light detector 202 is connected to the processing unit 105, to form a second light processing path.

With regard to the first light processing path, after receiving incident first target light, the first polarizer 101 polarizes the first target light, to form first polarized light in a first polarization direction, and transmits the first polarized light so formed to the magneto-optical material 103; the magneto-optical material 103 is in a current magnetic field, and rotates the polarization direction of the first polarized light according to the strength of the current magnetic field, toform corresponding third polarized light, and transmits the third polarized light to the first light filter 104; the first light filter 104 filters the third polarized light, to obtain fourth polarized light capable of passing in a second polarization direction, and transmits the fourth polarized light to the first light detector 201 by optical fibre; the first light detector 201 detects the intensity of the fourth polarized light, and sends the detected intensity of the fourth polarized light to the processing unit 105.

With regard to the second light processing path, after receiving incident second target light, the second polarizer 102 polarizes the second target light, to form second polarized light in the first polarization direction, and transmits the second polarized light so formed to the second light detector 202 by optical fibre; the second light detector 202 detects the intensity of the second polarized light, and sends the detected intensity of the second polarized light to the processing unit 105.

When the first target light and second target light are the same arc light, a large current arising together with the arc light gives rise to a large current magnetic field around the magneto-optical material 103. Under the action of the large current magnetic field, the magneto-optical material 103 rotates the polarization direction of the first polarized light through a large angle. If the first polarization direction is perpendicular to the second polarization direction, then the intensity of fourth polarized light that is able to pass through the first light filter 104 is high, and the intensity ratio of the fourth polarized light to the second polarized light is greater than a preset threshold (which threshold is greater than 0 and less than 1), in which case the processing unit 105 determines that the second target light is arc light.

When the first target light and second target light are light emitted by the same light source which is not arc light, since no large current magnetic field arises, the polarization direction of the first polarized light experiences very little rotation under the action of the magneto-optical material 103, therefore the polarization direction of the third polarized light is nearly the same as the first polarization direction. If the first polarization direction is perpendicular to the second polarization direction, then the intensity of fourth polarized light that is able to pass through the first light filter 104 is very low, and the intensity ratio of the fourth polarized light to the second polarized light is less than a preset threshold and close to zero, in which case the processing unit 105 determines that the second target light is not arc light.

When neither the first polarizer 101 nor the second polarizer 102 has received incident light, i.e. the intensities of the first target light and second target light are zero, the intensities of the second polarized light and fourth polarized light are correspondingly also zero, and the processing unit 105 experiences a calculation error when calculating the intensity ratio of the fourth polarized light to the second polarized light, in which case the processing unit 105 determines that no arc light has occurred.

In an embodiment of the present invention, the first polarization direction and second polarization direction may be the same, in which case the second target light is determined as being arc light if the intensity ratio of the fourth polarized light to the second polarized light is greater than 0 and less than a preset threshold (which threshold is greater than 0 and less than 1), the second target light is determined as not being arc light if the intensity ratio of the fourth polarized light to the second polarized light is greater than a preset threshold and close to 1, and it is determined that no arc light has occurred if the intensity ratio of the fourth polarized light to the second polarized light cannot be calculated.

Figure 3:
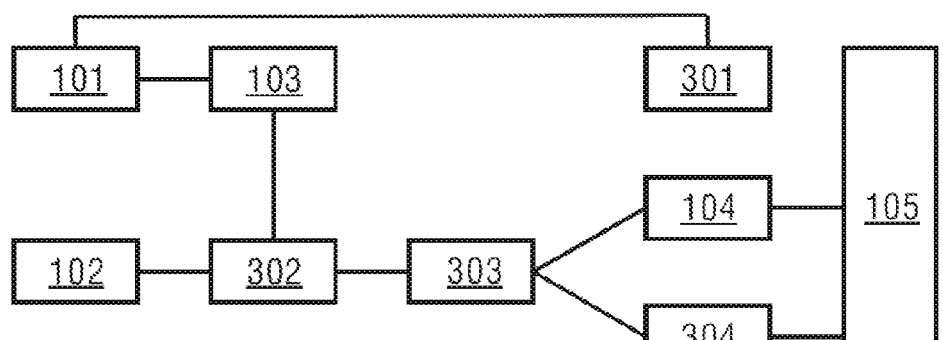
FIG. 3 is a schematic diagram of an arc light sensor with a self-check function provided in an embodiment of the present invention.

In the case of form B, as shown in FIG. 3, the arc light sensor comprises not only the first polarizer 101, second polarizer 102, magneto-optical material 103, first light filter 104 and processing unit 105, but also comprises a fixed light source 301, a coupling unit 302, a light splitter 303 and a second light filter 304;

the first polarizer 101 is connected to the magneto-optical material 103, the magneto-optical material 103 is connected to the coupling unit 302, the coupling unit 302 is connected by optical fibre to the light splitter 303, the light splitter 303 is connected by optical fibre to the first light filter 104, and the first light filter 104 is connected to the processing unit 105, to form a first light processing path;

the second polarizer 102 is connected to the coupling unit 302, the coupling unit 302 is connected by optical fibre to the light splitter 303, the light splitter 303 is connected to the second light filter 304, and the second light filter 304 is connected to the processing unit 105, to form a second light processing path.

With regard to the first light processing path, the fixed light source 301 emits first target light to the first polarizer 101; after receiving the incident first target light, the first polarizer 101 polarizes the first target light, to form first polarized light in a first polarization direction, and transmits the first polarized light so formed to the magneto-optical material 103; the magneto-optical material 103 is in a current magnetic field, and rotates the polarization direction of the first polarized light according to the strength of the current magnetic field, to form corresponding third polarized light, and transmits the third polarized light so formed to the coupling unit 302; the coupling unit 302 couples the third polarized light and second polarized light formed by the second polarizer into the same optical fibre, and transmits the coupled second polarized light and third polarized light to the light splitter 303 through the optical fibre; the light splitter 303 splits the coupled second polarized light and third polarized light into two beams of light, which are transmitted to the first light filter 104 and second light filter 304 respectively through optical fibres; the first light filter 104 filters the second polarized light and third polarized light received, filtering out fourth polarized light in the second polarized light and third polarized light that is able to pass in a second polarization direction; the processing unit 105 acquires the intensity of the fourth polarized light.

With regard to the second light processing path, after receiving incident second target light, the second polarizer 102 polarizes the second target light, to form second polarized light in the first polarization direction, and transmits the second polarized light so formed to the coupling unit 302; the coupling unit 302 couples the second polarized light and the third polarized light formed by the magneto-optical material 103 into the same optical fibre, and transmits the coupled second polarized light and third polarized light to the light splitter 303 through the optical fibre; the light splitter 303 splits the coupled second polarized light and third polarized light into two beams of light, which are transmitted to the first light filter 104 and second light filter 304 respectively through optical fibres; the second light filter 304 filters the second polarized light and third polarized light received, filtering out second polarized light in the second polarized light and third polarized light that is able to pass in the first polarization direction; the processing unit 105 acquires the intensity of the second polarized light.

When the second target light is arc light, in the first light processing path, a large current arising together with the arc light gives rise to a large current magnetic field around the magneto-optical material 103. Under the action of the large current magnetic field, the magneto-optical material 103 rotates the polarization direction of the first polarized light through a large angle, to form corresponding third polarized light. If the first polarization direction is perpendicular to the second polarization direction, the intensity of light in the second polarized light that is able to pass in the second polarization direction is close to zero, and the intensity of light in the third polarized light that is able to pass in the second polarization direction is large, therefore the intensity of the fourth polarized light is approximately equal to the intensity of the third polarized light that is able to pass in the second polarization direction, in which case the fourth polarized light has a high intensity. In the second light processing path, if the first polarization direction is perpendicular to the second polarization direction, second polarized light that is able to pass in the first polarization direction includes the second polarized light formed by the second polarizer 102 and a part of third polarized light that is able to pass in the first polarization direction. In this case, the intensity ratio of fourth polarized light to second polarized light is greater than a preset threshold, and the processing unit 105 determines that the second target light is arc light.

When the second target light is not arc light but some other light, in the first light processing path, since no large current magnetic field arises, the polarization direction of the first polarized light experiences very little rotation under the action of the magneto-optical material 103, therefore the polarization direction of the third polarized light is nearly the same as the first polarization direction. If the first polarization direction is perpendicular to the second polarization direction, the intensity of light in the second polarized light and third polarized light that is able to pass in the second polarization direction is very small, therefore the intensity of the fourth polarized light is close to zero; the intensity of light in the second polarized light and third polarized light that is able to pass in the first polarization direction is high, therefore the intensity of second polarized light formed by the second light filter 304 is high. In this case, the intensity ratio of fourth polarized light to second polarized light is close to zero, and less than a preset threshold, and the processing unit 105 determines that the second target light is not arc light.

When the second polarizer 102 has not received incident second target light, the fourth polarized light only includes light in the third polarized light that is able to pass in the second polarization direction. Since no arc light has occurred, the current magnetic field around the magneto-optical material 103 is small, and the polarization direction of the first polarized light experiences very little rotation under the action of the magneto-optical material 103, therefore the polarization direction of the third polarized light is nearly the same as the first polarization direction. If the first polarization direction is perpendicular to the second polarization direction, the intensity of third polarized light that is able to pass in the second polarization direction is very low, therefore the intensity of the fourth polarized light is close to zero. Since the polarization direction of the third polarized light is nearly the same as the first polarization direction, the intensity of second polarized light formed by the second light filter 304 is close to the intensity of the third polarized light received by the second light filter 304. In this case, the intensity ratio of fourth polarized light to second polarized light is close to zero, and less than a preset threshold, and the processing unit 105 determines that no arc light has occurred.

In one embodiment of the present invention, in the case of an arc light sensor of form B, the fixed light source 301 emits first target light to the first polarizer 101 in continuous form or pulsed form, and regardless of whether the second target light is arc light, or whether the intensity of the second target light is zero, the intensity of second polarized light formed by the second light filter 304 is not zero, therefore the processing unit 105 can determine whether a light communication line from the fixed light source 301 to the processing unit 105 is connected according to whether the intensity of second polarized light formed by the second light filter 304 is zero. This realizes self-checking of the arc light sensor; thus an abnormality in the arc light sensor can be discovered promptly upon its occurrence, ensuring the reliability of arc light detection.

Figure 4:
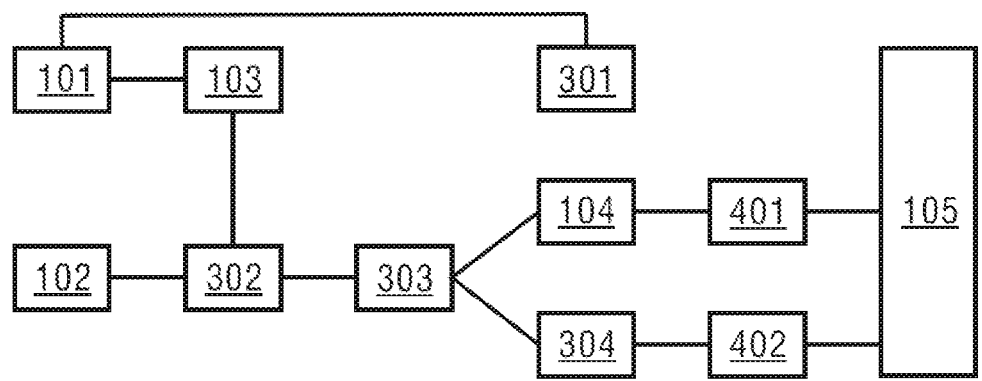
FIG. 4 is a schematic diagram of an arc light sensor with a self-check function provided in another embodiment of the present invention.

In one embodiment of the present invention, as FIG. 4 shows, an arc light sensor in form B also comprises a third light detector 401 and a fourth light detector 402;

the third light detector 401 is connected between the first light filter 104 and processing unit 105; the third light detector 401 acquires fourth polarized light outputted by the first light filter 104, detects the intensity of the fourth polarized light, and sends the detected intensity of the fourth polarized light to the processing unit 105;

the fourth light detector 402 is connected between the second light filter 304 and processing unit 105; the fourth light detector 402 acquires second polarized light outputted by the second light filter 304, detects the intensity of the second polarized light, and sends the detected intensity of the second polarized light to the processing unit 105.

Figure 5:
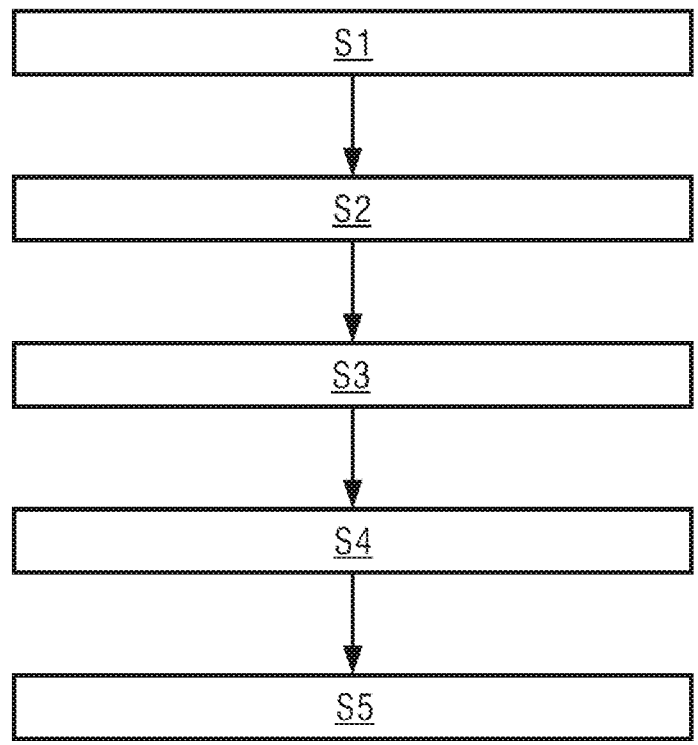
FIG. 5 is a flow chart of an arc light detection method provided in an embodiment of the present invention.

As FIG. 5 shows, one embodiment of the present invention provides an arc light detection method, which method may comprise the following steps:

S1: polarizing incident first target light, to form first polarized light in a first polarization direction;

S2: polarizing incident second target light, to form second polarized light in the first polarization direction;

S3: using a current magnetic field to rotate a polarization direction of the first polarized light, to form third polarized light;

S4: filtering the third polarized light, to form fourth polarized light capable of passing in a second polarization direction;

S5: determining whether the second target light is arc light according to the intensity of the second polarized light and the intensity of the fourth polarized light.

In the arc light detection method provided in an embodiment of the present invention, the current magnetic field is used to rotate the polarization direction of first polarized light to form third polarized light; the polarization direction of the third polarized light determines the intensity of fourth polarized light that is able to pass in the second polarization direction, and the polarization direction of the third polarized light corresponds to the strength of the current magnetic field. When arc light occurs accompanied by an overcurrent phenomenon, the large current will give rise to a strong current magnetic field; under the action of the large current magnetic field, the polarization direction of the first polarized light rotates through a large angle, causing a large change in the intensity of the fourth polarized light. The intensity of the second polarized light reflects the intensity of the second target light, hence it is possible to determine whether the second target light is arc light according to the intensity of the fourth polarized light and the intensity of the second polarized light. Since there is no need to acquire a specific current signal, with a current signal instead being embodied through conversion to fourth polarized light intensity, a situation where a current signal suffers interference from various factors, causing interference to the arc light determination result, is avoided, thereby increasing the interference resistance of the arc light sensor used for arc light detection.

In one embodiment of the present invention, since different arc lights correspond to different light intensities and different current values, the second polarized light intensities and fourth polarized light intensities corresponding to different arc lights are also not exactly the same, and it is difficult to determine whether the second target light is arc light by way of a determined second polarized light threshold and a determined fourth polarized light threshold. When the intensity of arc light is higher, the current arising together with the arc light is also larger, causing the intensity ratio of the fourth polarized light to the second polarized light to be a fixed value within a certain interval, hence it is possible to determine whether the second target light is arc light according to the intensity ratio of the fourth polarized light to the second polarized light, thereby increasing the accuracy of arc light detection.

In one embodiment of the present invention, before incident first target light is received, first target light is emitted via a fixed light source. After the second polarized light and third polarized light have been formed, it is possible to couple the second polarized light and third polarized light together, split the coupled second polarized light and third polarized light into two beams of coupled light, filter second polarized light and third polarized light in first coupled light, to form fourth polarized light capable of passing in the second polarization direction, and filter third polarized light in second coupled light, to form third polarized light capable of passing in the first polarization direction as a part of second polarized light; through such a light processing method, it is possible to determine whether the second target light is arc light according to the intensity ratio of fourth polarized light to second polarized light. Through such an arc light detection method, regardless of whether the second target light is arc light, it is possible to filter out second polarized light capable of passing in the first polarization direction from the second coupled light, hence it is possible to determine whether a light communication line is connected according to the intensity of second polarized light, and a problem in the light communication line can be discovered promptly upon its occurrence, ensuring the reliability of arc light detection.

Figure 6:
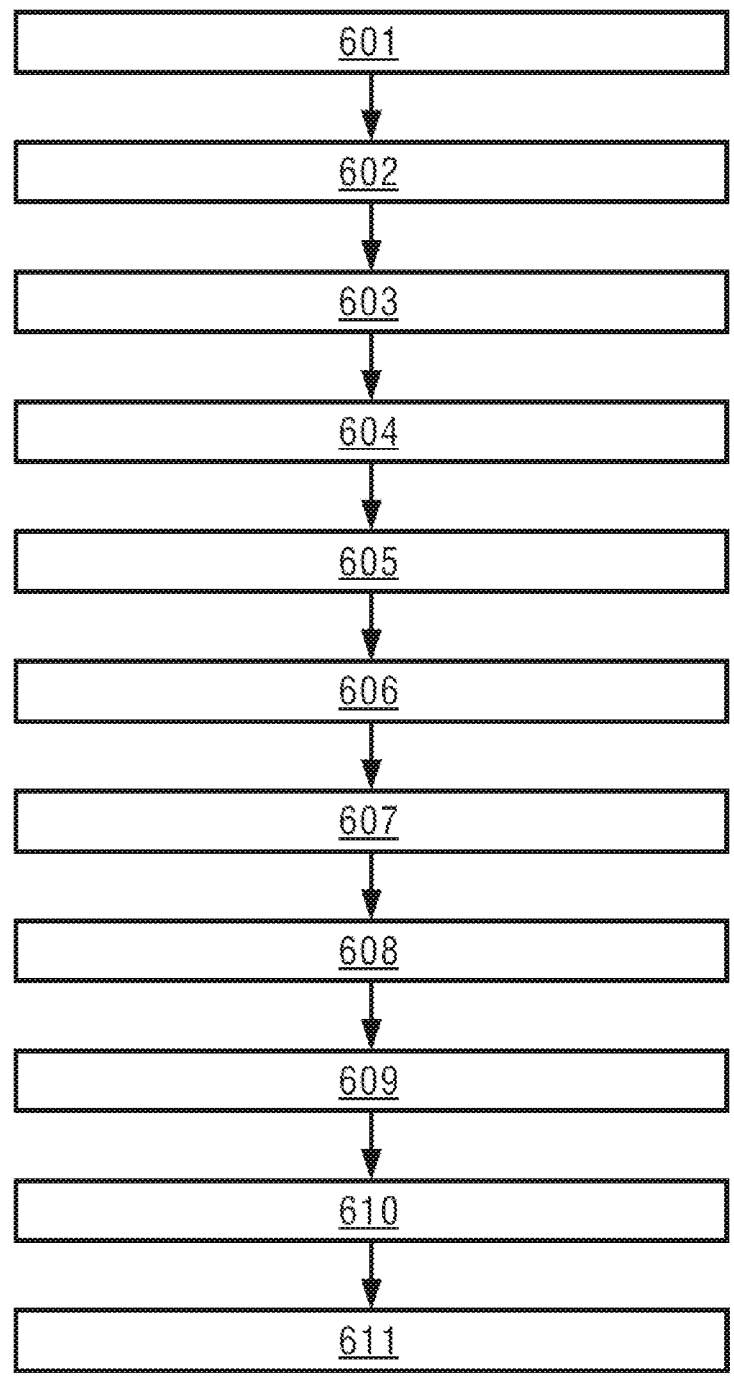
FIG. 6 is a flow chart of an arc light detection method provided in another embodiment of the present invention.

To clarify the arc light detection method provided in an embodiment of the present invention, the arc light detection method provided in an embodiment of the present invention is explained in further detail below with reference to the arc light sensor shown in FIG. 4 as an example. Referring to FIG. 6, the method comprises:

Step 601: sending first target light to a first polarizer via a fixed light source.

In one embodiment of the present invention, as FIG. 4 shows, the fixed light source 301 emits first target light to the first polarizer 101 according to a preset form of light emission, wherein the first target light may be a continuous light beam, or a light beam in pulsed form. The fixed light source 301 may be an LED light source.

Step 602: polarizing the first target light via a first polarizer, to form first polarized light.

In one embodiment of the present invention, as FIG. 4 shows, after receiving first target light emitted by the fixed light source 301, the first polarizer 101 polarizes the first target light, to form first polarized light in a first polarization direction, and transmits the first polarized light so formed to the magneto-optical material 103. For example, using a filter glass as the first polarizer, the filter glass can filter light with oscillation direction in a vertical plane, to form polarized light with oscillation direction in a horizontal plane; when first target light has passed through the filter glass, light which oscillates in the vertical plane is filtered out of the first target light, to form first polarized light with oscillation direction in the horizontal plane, so that the first polarization direction is a horizontal direction.

Step 603: a magneto-optical material using a current magnetic field to rotate a polarization direction of the first polarized light, to form third polarized light.

In one embodiment of the present invention, as FIG. 4 shows, when the first polarizer 101 has formed the first polarized light, the first polarized light is transmitted into the magneto-optical material 103. The magneto-optical material is located in the vicinity of a circuit in which arc light might occur; a current magnetic field arises in the circuit, and the magneto-optical material 103 rotates the polarization direction of the first polarized light according to the strength of the current magnetic field around the magneto-optical material, to form third polarized light. The larger the value of current in the circuit, the greater the strength of the current magnetic field formed by the current; the greater the strength of the current magnetic field, the greater the angle through which the magneto-optical material 103 located in the current magnetic field rotates the polarization direction of the polarized light. When the magneto-optical material 103 has formed the third polarized light, the third polarized light so formed is transmitted to the coupling unit 302 by optical fibre.

Step 604: receiving incident second target light by a second polarizer, and polarizing the second target light, to form second polarized light.

In one embodiment of the present invention, as FIG. 4 shows, second target light which might be arc light is received by the second polarizer 102. After the second polarizer 102 receives incident second target light, the second target light is polarized, to form second polarized light in the first polarization direction, and the second polarized light so formed is transmitted to the coupling unit 302. For example, using a filter glass as the second polarizer, wherein this filter glass is identical to the filter glass serving as the first polarizer, light with oscillation direction in a vertical plane can be filtered, to form polarized light with oscillation direction in a horizontal plane; when second target light has passed through the filter glass, light which oscillates in the vertical plane is filtered out of the second target light, to form second polarized light with oscillation direction in the horizontal plane.

Step 605: coupling the second polarized light and third polarized light together via a coupling unit, and transmitting the coupled light to a light splitter.

In one embodiment of the present invention, as FIG. 4 shows, the coupling unit 302 receives the third polarized light formed in step 603 and the second polarized light formed in step 604, then couples the second polarized light and third polarized light into the same optical fibre, and transmits the coupled light to the light splitter 303 through the optical fibre.

Step 606: splitting the second polarized light and third polarized light, which have been coupled together, into two beams via the light splitter, and transmitting the two beams to a first light filter and a second light filter respectively.

In one embodiment of the present invention, as FIG. 4 shows, after receiving the second polarized light and third polarized light which have been coupled together, the light splitter 303 splits the second polarized light and third polarized light which have been coupled together into two completely identical beams of coupled light, which are first coupled light and second coupled light respectively, transmitting the first coupled light to the first light filter 104 through an optical fibre, and transmitting the second coupled light to the second light filter 304 through an optical fibre.

Step 607: filtering first coupled light via the first light filter to form fourth polarized light, and transmitting the fourth polarized light to a third light detector.

In one embodiment of the present invention, as FIG. 4 shows, after receiving the first coupled light sent by the light splitter 303, the first light filter 104 filters second polarized light and third polarized light comprised in the first coupled light, such that third polarized light and second polarized light capable of passing in a second polarization direction pass through, to form fourth polarized light, and transmits the fourth polarized light so formed to the third light detector 401 through an optical fibre. For example, using a filter glass as the first light filter, the filter glass allows light with oscillation direction in a vertical plane to pass through; after first coupled light is transmitted to the filter glass, part of the third polarized light and second polarized light capable of passing in a vertical direction passes through the filter glass, and is transmitted as fourth polarized light to the first light detector, thus the second polarization direction is a vertical direction, which is perpendicular to the first polarization direction.

Step 608: filtering second coupled light via the second light filter to form second polarized light, and transmitting the second polarized light to the second light detector.

In one embodiment of the present invention, as FIG. 4 shows, after receiving the second coupled light sent by the light splitter 303, the second light filter 304 filters third polarized light comprised in the second coupled light, takes third polarized light capable of passing in the first polarization direction to be apart of second polarized light, and transmits second polarized light formed to the fourth light detector 402 through an optical fibre. For example, using a filter glass as the second light filter, the filter glass allows light with oscillation direction in a horizontal plane to pass through; after second coupled light is transmitted to the filter glass, part of the third polarized light capable of passing in a horizontal direction and all of the second polarized light pass through the filter glass, and the light which passes through the filter glass is transmitted as second polarized light the fourth light detector.

Step 609: acquiring the intensity of the fourth polarized light via the third light detector, and acquiring the intensity of second polarized light via the fourth light detector.

In one embodiment of the present invention, as FIG. 4 shows, after receiving fourth polarized light transmitted by the first light filter 104, the third light detector 401 detects the intensity of the fourth polarized light, and send the detected intensity of the fourth polarized light to the processing unit 105; after the receiving second polarized light transmitted by the second light filter 304, the fourth light detector 402 detects the intensity of the second polarized light, and sends the detected intensity of the second polarized light to the processing unit 105.

Step 610: determining whether the second target light is arc light via a processing unit.

In one embodiment of the present invention, as FIG. 4 shows, the processing unit 105 receives the intensity of fourth polarized light sent by the third light detector 401 and the intensity of second polarized light sent by the fourth light detector 402, and after receiving the intensity of fourth polarized light and the intensity of second polarized light, calculates the intensity ratio of fourth polarized light to second polarized light, compares the calculated intensity ratio with a preset threshold range, and determines whether the second target light is arc light.

For example, the preset threshold range is (a,b); when the second target light is arc light, a large current will arise together with the second target light, and at an action point of a current magnetic field formed by the large current, the magneto-optical material causes the polarization direction of first polarized light to rotate through a large angle. Since the first polarization direction is perpendicular to the second polarization direction, the intensity of light, within the third polarized light, that is able to pass through the first light filter is large, i.e. the intensity of fourth polarized light is high. At the same time, since the intensity of the arc light itself is very high, the intensity of second polarized light is also high, in which case the intensity ratio of fourth polarized light to second polarized light is greater than 0 and less than 1, and it is determined by pre-calculation that when the second target light is arc light, the intensity ratio of fourth polarized light to second polarized light is located in the interval (a,b), where $0<a<b<1$. Thus, when the intensity ratio of fourth polarized light to second polarized light is located in the interval (a,b), it is determined that the second target light is arc light.

When the second target light is not arc light, there is no large current arising together therewith, the current magnetic field around the magneto-optical material is small, and the polarization direction of the first polarized light remains substantially unchanged. The polarization directions of second polarized light and third polarized light transmitted to the first light filter are substantially perpendicular to the polarization direction in which the first light filter allows passage, therefore very little second polarized light and third polarized light can pass through the first light filter, so that the intensity of fourth polarized light is close to zero, but the intensity of second polarized light that is able to pass through the second light filter is still high, in which case the intensity ratio of fourth polarized light to second polarized light is close to zero. Therefore, when the intensity ratio of fourth polarized light to second polarized light is less than "a" and close to zero, it is determined that the second target light is not arc light.

When the intensity of the second target light is zero, i.e. no second target light is incident, the intensity of fourth polarized light is close to zero, and the intensity of second polarized light is high, in which case the intensity ratio of fourth polarized light to second polarized light is close to zero. Therefore, when the intensity ratio of fourth polarized light to second polarized light is less than "a" and close to zero, it is determined that no arc light has occurred.

Thus, it is determined that arc light has occurred if the intensity ratio of fourth polarized light to second polarized light is located in the interval (a,b), and it is determined that no arc light has occurred if the intensity ratio of fourth polarized light to second polarized light is located outside the interval (a,b).

Step 611: determining whether the arc light sensor is operating normally according to the intensity of second polarized light.

In one embodiment of the present invention, as FIG. 4 shows, the processing unit 105 determines whether the arc light sensor is operating normally according to the form in which the fixed light source 301 emits first target light to the first polarizer 101. When the fixed light source 301 emits first target light to the first polarizer 101 continuously, if the processing unit 105 is able to continuously receive the intensity of second polarized light sent by the fourth light detector 402, this indicates that a signal line from the fixed light source 301 to the processing unit 105 is connected, and the processing unit 105 determines that the arc light sensor is operating normally, otherwise it determines that the arc light sensor is operating abnormally. When the fixed light source 301 emits first target light in pulsed form, if the processing unit 105 receives the intensity of second polarized light in pulsed form, the processing unit 105 determines that the arc light sensor is operating normally, otherwise it determines that the arc light sensor is operating abnormally.

It must be explained that the various steps shown in FIG. 6 have been separated for the purpose of explaining the arc light detection method more clearly. During the implementation of actual service, no strict chronological sequence applies to the various steps; for example, step 604 may be performed at the same time as step 601, and step 611 may be performed at any position between step 601 and step 610.

The arc light sensor and arc light detection method provided in the present invention at least have the following beneficial effects:

1. In the arc light sensor and arc light detection method of the present invention, the magneto-optical material can rotate the polarization direction of first polarized light under the action of a current magnetic field to form third polarized light. Since the occurrence of arc light is accompanied by an overcurrent phenomenon, a larger current will give rise to a stronger current magnetic field, and the magneto-optical material causes the polarization direction of the first polarized light to rotate through a larger angle under the action of the stronger current magnetic field. The polarization direction of the third polarized light determines the intensity of the fourth polarized light that is able to pass through the first light filter, therefore the intensity of the fourth polarized light reflects the size of the current. The intensity of the second polarized light reflects the intensity of the second target light, hence it is possible to determine whether the second target light is arc light according to the intensity of the second polarized light and the intensity of the fourth polarized light. Since there is no need to acquire a current signal, a situation where a current signal suffers interference from various factors, causing interference to the determination result, is avoided, thereby increasing the interference resistance of the arc light sensor.

2. In one embodiment of the arc light sensor and arc light detection method of the present invention, the processing unit determines whether the second target light is arc light according to the intensity ratio of fourth polarized light to second polarized light, thereby solving the problem of inaccurate determination (due to the fact that different arc lights correspond to different light energies and current values) when the intensities of fourth polarized light and second polarized light are judged by way of fixed thresholds in order to determine whether second target light is arc light, and thereby increasing the accuracy of arc light detection.

3. In one embodiment of the arc light sensor and arc light detection method of the present invention, with regard to the arc light sensor in form B, the processing unit can perform self-checking of a communication line of the arc light sensor according to the intensity of second polarized light, and can discover a problem in the communication line of the arc light sensor promptly upon its occurrence, and so can increase the reliability of the arc light sensor.

4. In one embodiment of the arc light sensor and arc light detection method of the present invention, the arc light sensor has two forms, A and B; the arc light sensor in form B can realize a self-checking function, and the structure of the arc light sensor in form A is comparatively simple. During the implementation of actual service, a choice may be made flexibly according to demands, so the applicability of the arc light sensor is increased.

It must be explained that relationship terms such as "first" and "second" as used herein are merely intended to distinguish one entity or operation from another entity or operation, and do not necessarily require or imply the existence of any such actual relationship or order between these entities or operations. Moreover, the terms "comprise" and "include", or any other variant thereof, are intended to cover non-exclusive inclusion, so that a process, method, article or device which comprises a series of key elements does not comprise these key elements alone, but also comprises other key elements which are not listed explicitly, or also comprises intrinsic key elements of this process, method, article or device. In the absence of further restrictions, a key element defined by the statement "comprises a . . . " does not exclude the existence of another identical element in the process, method, article or device which comprises the key element.

Those skilled in the art will understand that: all or some of the steps in embodiments of the method described above may be implemented via hardware associated with program instructions. The program may be stored in a computer-readable storage medium, and when executed, the program performs steps including the embodiments of the method described above. The storage media include various media capable of storing program code, such as ROM, RAM, magnetic disk or optical disk.

Finally, it must be explained that the embodiments above are merely preferred embodiments of the present invention, which are merely intended to explain the technical solution of the present invention, and are not intended to define the scope of protection of the present invention. Any amendments, equivalent substitutions or improvements etc. made within the spirit and principles of the present invention shall be included in the scope of protection thereof.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An arc light sensor, comprising:
a first polarizer;
a second polarizer;
a magneto-optical material;
a first light filter; and
a processing unit,
the first polarizer being configured to polarize incident first target light, to form first polarized light in a first polarization direction, and to transmit the first polarized light to the magneto-optical material,
the second polarizer being configured to polarize incident second target light, to form second polarized light in the first polarization direction,
the magneto-optical material, in a current magnetic field, being configured to use the current magnetic field to rotate a polarization direction of the first polarized light, to form third polarized light, and to transmit the third polarized light to the first light filter,
the first light filter being configured to filter the third polarized light, to form fourth polarized light capable of passing in a second polarization direction, and
the processing unit being configured to determine whether the incident second target light is arc light according to intensity of the second polarized light and intensity of the fourth polarized light.

2. The arc light sensor of claim 1, wherein
the first polarization direction is perpendicular to the second polarization direction.

3. The arc light sensor of claim 2, wherein
the processing unit is configured to determine whether the incident second target light is arc light according to an intensity ratio of the intensity of the fourth polarized light to the intensity of the second polarized light.

4. The arc light sensor of claim 2, wherein
when the incident first target light and the incident second target light are light emitted by a same light source, the arc light sensor further comprises: a first light detector and a second light detector,
the first light detector being configured to acquire the fourth polarized light formed by the first light filter, to detect the intensity of the fourth polarized light, and to send the intensity of the fourth polarized light to the processing unit,
the second light detector being configured to acquire the second polarized light formed by the second polarizer, to detect the intensity of the second polarized light, and to send the intensity of the second polarized light to the processing unit.

5. The arc light sensor of claim 2, wherein
when the incident first target light and the incident second target light are light emitted by different light sources, the arc light sensor further comprises: a fixed light source, a coupling unit, a light splitter and a second light filter, the fixed light source being configured to emit the first target light to the first polarizer, the coupling unit being separately connected to the second polarizer, the magneto-optical material and the light splitter separately, and being configured to couple together the second polarized light formed by the second polarizer and the third polarized light formed by the magneto-optical material, and being configured to transmit coupled light to the light splitter, the light splitter being separately connected to the first light filter and the second light filter, and being configured to split the coupled light into two beams of coupled light, being configured to transmit first coupled light to the first light filter, and being configured to transmit second coupled light to the second light filter, the first light filter being further configured to filter the second polarized light in the first coupled light, taking the second polarized light that is able to pass in the second polarization direction to be a part of the fourth polarized light, and being configured to output the fourth polarized light, and the second light filter being configured to filter the third polarized light in the second coupled light, taking the third polarized light that is able to pass in the first polarization direction to be a part of the second polarized light, and being configured to output the second polarized light.

6. The arc light sensor of claim 5, wherein
the processing unit is further configured to determine whether a light communication line from the fixed light source to the processing unit is connected according to the intensity of the second polarized light.

7. The arc light sensor of claim 1, wherein
the processing unit is configured to determine whether the incident second target light is arc light according to an intensity ratio of the intensity of the fourth polarized light to the intensity of the second polarized light.

8. The arc light sensor of claim 7, wherein
the first polarization direction is perpendicular to the second polarization direction.

9. The arc light sensor of claim 7, wherein
when the incident first target light and the incident second target light are light emitted by a same light source, the arc light sensor further comprises: a first light detector and a second light detector, the first light detector being configured to acquire the fourth polarized light formed by the first light filter, to detect the intensity of the fourth polarized light, and to send the intensity of the fourth polarized light to the processing unit, the second light detector being configured to acquire the second polarized light formed by the second polarizer, to detect the intensity of the second polarized light, and to send the intensity of the second polarized light to the processing unit.

10. The arc light sensor of claim 7, wherein
when the incident first target light and the incident second target light are light emitted by different light sources, the arc light sensor further comprises: a fixed light source, a coupling unit, a light splitter and a second light filter, the fixed light source being configured to emit the first target light to the first polarizer, the coupling unit being separately connected to the second polarizer, the magneto-optical material and the light splitter separately, and being configured to couple together the second polarized light formed by the second polarizer and the third polarized light formed by the magneto-optical material, and being configured to transmit coupled light to the light splitter, the light splitter being separately connected to the first light filter and the second light filter, and being configured to split the coupled light into two beams of coupled light, being configured to transmit first coupled light to the first light filter, and being configured to transmit second coupled light to the second light filter, the first light filter being further configured to filter the second polarized light in the first coupled light, taking the second polarized light that is able to pass in the second polarization direction to be a part of the fourth polarized light, and being configured to output the fourth polarized light, and the second light filter being configured to filter the third polarized light in the second coupled light, taking the third polarized light that is able to pass in the first polarization direction to be a part of the second polarized light, and being configured to output the second polarized light.

11. The arc light sensor of claim 10, wherein
the processing unit is further configured to determine whether a light communication line from the fixed light source to the processing unit is connected according to the intensity of the second polarized light.

12. The arc light sensor of claim 1, wherein
when the incident first target light and the incident second target light are light emitted by a same light source, the arc light sensor further comprises: a first light detector and a second light detector, the first light detector being configured to acquire the fourth polarized light formed by the first light filter, to detect the intensity of the fourth polarized light, and to send the intensity of the fourth polarized light to the processing unit, the second light detector being configured to acquire the second polarized light formed by the second polarizer, to detect the intensity of the second polarized light, and to send the intensity of the second polarized light to the processing unit.

13. The arc light sensor of claim 12, wherein
the first polarization direction is perpendicular to the second polarization direction.

14. The arc light sensor of claim 12, wherein
the processing unit is configured to determine whether the incident second target light is arc light according to an intensity ratio of the intensity of the fourth polarized light to the intensity of the second polarized light.

15. The arc light sensor of claim 1, wherein
when the incident first target light and the incident second target light are light emitted by different light sources, the arc light sensor further comprises: a fixed light source, a coupling unit, a light splitter and a second light filter, the fixed light source being configured to emit the first target light to the first polarizer, the coupling unit being separately connected to the second polarizer, the magneto-optical material and the light splitter separately, and being configured to couple together the second polarized light formed by the second polarizer and the third polarized light formed by the magneto-optical material, and being configured to transmit coupled light to the light splitter, the light splitter being separately connected to the first light filter and the second light filter, and being configured to split the coupled light into two beams of coupled light, being configured to transmit first coupled light to the first light filter, and being configured to transmit second coupled light to the second light filter, the first light filter being further configured to filter the second polarized light in the first coupled light, taking the second polarized light that is able to pass in the second polarization direction to be a part of the fourth polarized light, and being configured to output the fourth polarized light, and the second light filter being configured to filter the third polarized light in the second coupled light, taking the third polarized light that is able to pass in the first polarization direction to be a part of the second polarized light, and being configured to output the second polarized light.

16. The arc light sensor of claim 15, wherein the processing unit is further configured to determine whether a light communication line from the fixed light source to the processing unit is connected according to the intensity of the second polarized light.

17. The arc light sensor of claim 15, further comprising:

a third light detector; and a fourth light detector, the third light detector being configured to acquire the fourth polarized light outputted by the first light filter, to detect the intensity of the fourth polarized light, and to send the intensity of the fourth polarized light to the processing unit, the fourth light detector being configured to acquire the second polarized light outputted by the second light filter, to detect the intensity of the second polarized light, and to send the intensity of the second polarized light to the processing unit.

18. An arc light detection method, further comprising:

polarizing incident first target light, to form first polarized light in a first polarization direction;

polarizing incident second target light, to form second polarized light in the first polarization direction;

using a current magnetic field to rotate a polarization direction of the first polarized light, to form third polarized light;

filtering the third polarized light, to form fourth polarized light capable of passing in a second polarization direction; and determining whether the incident second target light is arc light according to intensity of the second polarized light and intensity of the fourth polarized light.

19. The method of claim 18, wherein the determining includes determining whether the incident second target light is arc light according to an intensity ratio of the intensity of the fourth polarized light to the intensity of the second polarized light.

20. The method of claim 18, wherein, before the polarizing of incident first target light, the method further comprises:

emitting the incident first target light via a fixed light source; and after the using of the current magnetic field, and before the filtering of the third polarized light, the method further comprises:

coupling together the second polarized light and the third polarized light to form coupled light, and splitting the coupled light into two beams of coupled light, which are first coupled light and second coupled light respectively;

filtering the second polarized light in the first coupled light, and taking the second polarized light that is able to pass in the second polarization direction to be a part of the fourth polarized light; and filtering the third polarized light in the second coupled light, and taking the third polarized light that is able to pass in the first polarization direction to be a part of the second polarized light.

\* \* \* \* \*